US008856865B1

(12) United States Patent
Martini

(10) Patent No.: US 8,856,865 B1
(45) Date of Patent: Oct. 7, 2014

(54) PRIORITIZING CONTENT CLASSIFICATION CATEGORIES

(71) Applicant: Phantom Technologies, Inc., San Diego, CA (US)

(72) Inventor: Paul Michael Martini, San Diego, CA (US)

(73) Assignee: iboss, Inc., San Diego, CA (US)

( * ) Notice: Subject to any disclaimer, the term of this patent is extended or adjusted under 35 U.S.C. 154(b) by 0 days.

(21) Appl. No.: 13/896,233

(22) Filed: May 16, 2013

(51) Int. Cl.
*G06F 21/00* (2013.01)
*H04L 29/06* (2006.01)

(52) U.S. Cl.
CPC .................................. *H04L 63/20* (2013.01)
USPC ............................................. 726/1; 709/223

(58) Field of Classification Search
USPC ............................................................ 726/1
See application file for complete search history.

(56) References Cited

U.S. PATENT DOCUMENTS

| 6,947,985 | B2 * | 9/2005 | Hegli et al. | 709/224 |
|---|---|---|---|---|
| 7,810,160 | B2 | 10/2010 | Dougherty et al. | |
| 2002/0066033 | A1 * | 5/2002 | Dobbins et al. | 713/201 |
| 2004/0015586 | A1 * | 1/2004 | Hegli et al. | 709/225 |
| 2006/0149727 | A1 * | 7/2006 | Viitaharju | 707/5 |
| 2007/0073694 | A1 * | 3/2007 | Picault et al. | 707/9 |
| 2007/0214145 | A1 * | 9/2007 | Subramaniam et al. | 707/10 |
| 2007/0260603 | A1 * | 11/2007 | Tuscano et al. | 707/9 |
| 2012/0291087 | A1 * | 11/2012 | Agrawal | 726/1 |
| 2013/0239168 | A1 | 9/2013 | Sreenivas et al. | |
| 2013/0254833 | A1 * | 9/2013 | Nicodemus et al. | 726/1 |

OTHER PUBLICATIONS

"Untangle", Web Filter Categories screenshot, retrieved on Jun. 20, 2012, 1 page.
'Cymphonix' [online] "How does Cymphonix Internet Management™ Work?" 2013, [retrieved on Apr. 26, 2013]. Retrieved from the Internet: http://cymphonix.corn/How-Cymphonix-Works 3 pages.

(Continued)

*Primary Examiner* — Jason K. Gee
*Assistant Examiner* — Maung Lwin
(74) *Attorney, Agent, or Firm* — Fish & Richardson P.C.

(57) ABSTRACT

Methods, systems, and apparatus, including computer programs encoded on computer storage media, for prioritizing content classification categories. One of the methods includes maintaining two or more content categories including a first content category and a second content category, each content category having an associated score, receiving, from a user device, a request to access a resource, the resource being associated both with the first content category and with the second content category, determining a content access policy for the user device to the resource based on the respective scores associated with the first and second content categories, and selectively permitting or denying access to the resource by the user device depending on the determined content access policy.

30 Claims, 8 Drawing Sheets

(56) References Cited

OTHER PUBLICATIONS

'Barracuda' [online]. "Complete Network Protection: Integrated web content filtering, anti-virus, anti-spyware, bandwidth control & blocking of unauthorized applications," 2013, [retrieved on Apr. 26, 2013]. Retrieved from the Internet: https://www.barracuda.com/products/webfilter/features 6 pages.

Light Speed Systems, "Information Guide—Web Filtering in Today's Schools: Balancing IT and Educator Needs," [retrieved on Apr. 26, 2013]. Retrieved from the Internet: //www.lightspeedsystems.com/wp-content/uploads/2012/12/Web-Filtering-Guide.pdf 4 pages.

'Fortinet' [online]. "Web Filtering," 2013, [retrieved on Apr. 26, 2013]. Retrieved from the Internet: http://www.fortinet.com/solution/web_filtering.html 2 pages.

'EdgeWave' [online] "Web Filtering and Content Management System: Meeting Threats Head-on," [retrieved on Apr. 26, 2013]. Retrieved from the Internet: http://www.web-filtering.edgewave.com/meeting-threats.shtml 1 page.

'EdgeWave' [online]. "iPrism Protection: Proactive Internet Explorer Web Filtering and Content Management System," 2013, [retrieved on Apr. 26, 2013]. Retrieved from the Internet: http://www.web-filtering.edgewave.com/ 2 pages.

'Telemate' [online]. "NetSpective® Internet Content Filter: Passive & Web Proxy Internet Filter," 2012, [retrieved on Apr. 26, 2013]. Retrieved from the Internet: http://www.telemate.net/products/netspective 2 pages.

'Untangle' [online] "Web Filter," 2013, [retrieved on Apr. 26, 2013]. Retrieved from the Internet: http://www.untangle.com/stor/web-filter-conf.html 2 pages.

\* cited by examiner

300

| Computers | Users | Groups |

Filtering Groups 304a
1. Name: Default  306a
Alias Group Names: [ 308a ]
Logging: Enabled
Priority: 25  310a
Reporting Group: 1
Override Group: No
Override Timeout: 0  Min
Notes:

304b
2. Name: Managers  306b
Alias Group Names: Supervisors  308b
Logging: Enabled
Priority: 1000  310b
Reporting Group: 1

PRIORITIZING CONTENT CLASSIFICATION CATEGORIES

TECHNICAL FIELD

This specification relates to systems and techniques that facilitate the linking of user access policies across different network services and products.

BACKGROUND

Directory services for organizing network users into groups are often used in computer network environments. Some directory services include Active Directory, OpenDirectory, eDirectory, and OpenLDAP, among others. Each directory service serves a common purpose of organizing computer users on a network into user groups and organizational units (OUs) depending on a user's role in an organization. Users with the similar policies and organizational roles, such as employees, managers, network administrators, are typically placed into the same user group or OU within the directory service.

Typical items stored within the directory are identities of the users allowed to log into the network, and the computers that are registered within the organization. Each user record, for example, contains many details about the user including the user's computer login name, email address, phone number, user roles within the organization, and full name.

Some directory services are based on a common platform called Lightweight Directory Access Protocol (LDAP), which provides a common method for communication between directory service products developed by different vendors, such as Active Directory (a product by Microsoft Corporation) or eDirectory (a product by Novell, Inc.). Typically, the internal core of a vendor's directory server implementation is LDAP, or the vendor provides an LDAP networking interface that provides a common language for communication between a first directory server that requires access to information contained within a second directory server developed by another vendor.

Due to the fact that directory services contain such detailed information about each user on the network, a directory service becomes a critical source of information to other network services and products on a network that rely on this information to provide network services.

SUMMARY

In general, one aspect of the subject matter described in this specification can be embodied in methods that include the actions of maintaining two or more content categories including a first content category and a second content category, each content category having an associated score, receiving, from a user device, a request to access a resource, the resource being associated both with the first content category and with the second content category, determining a content access policy for the user device to the resource based on the respective scores associated with the first and second content categories, and selectively permitting or denying access to the resource by the user device depending on the determined content access policy. Other implementations of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them, installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In particular, one implementation may include all the following features in combination. The determining may comprise determining whether a first content category score associated with the first content category is greater than a second content category score associated with the second content category, and determining the content access policy for the user device to the resource, the content access policy being for the first content category. The determining the content access policy for the user device may further comprise comparing the first content category score with a threshold score value, and determining the content access policy for the user device to the resource based on the first content category score being greater than the threshold score value.

In some implementations, the determining comprises comparing a highest score for the first content category and the second content category with a threshold score value, and selecting a default content access policy as the content access policy based on the highest score not being greater than the threshold score value. The content categories and the associated scores may be defined in a policy group that includes the content access policy. The determining may comprise determining that a first content category score associated with the first content category is the same as a second content category score associated with the second content category, determining, based on determining that the first content category score is the same as the second content category score, whether a first content access policy associated with the first content category is more restrictive than a second content access policy associated with the second content category, and applying, based on determining that the first content access policy is more restrictive than the second content access policy, the first content access policy to the request to access the resource.

In some implementations, the method further comprises providing instructions for the presentation of a user interface, the instructions including a policy group name and a content category name for at least one of the two or more content categories, and receiving information associated with at least one of the two or more content categories, wherein the maintaining comprises maintaining the received information. The information may comprise a score associated with one of the two or more content categories. The information may comprise a permission selection associated with one of the two or more content categories. The content access policy for a specific content category may be based on an associated permission selection for the specific content category.

The subject matter described in this specification may be implemented in various implementations to realize one or more of the following potential advantages. In some implementations, linking of a directory user group with a policy group based on both groups having the same name simplifies the integration of products with a directory service. In some implementations, linking of a directory server user group with a policy group based on both groups having the same name provides a network administrator with an easy way to associate policies on a network service with directory service user groups. In some implementations, linking of a directory server user group with a policy group based on both groups having the same name provides better integration for multiple different network services that access a single directory service. In some implementations, appending a unique directory service identifier to the end of a policy group name allows a network service to associate different policies that have the same name with different directory services.

In some implementations, scoring content category policies allows a network resource to be associated with a new combination of multiple base categories without requiring a new policy for the network resource and preventing exponential growth in the total number of combination categories. In some implementations, scoring content category policies allows a network service to provide access to a network resource that is associated with a new combination of multiple base categories without waiting for a new content category definition based on the new combination of multiple base categories.

Details of one or more implementations are set forth in the accompanying drawings and the description below. Other features, aspects, and potential advantages will become apparent from the description, the drawings, and the claims.

BRIEF DESCRIPTION OF THE DRAWINGS

FIG. 3 is an example of a policy group overview user interface.

Like reference numbers and designations in the various drawings indicate like elements.

DETAILED DESCRIPTION

Figure 1:
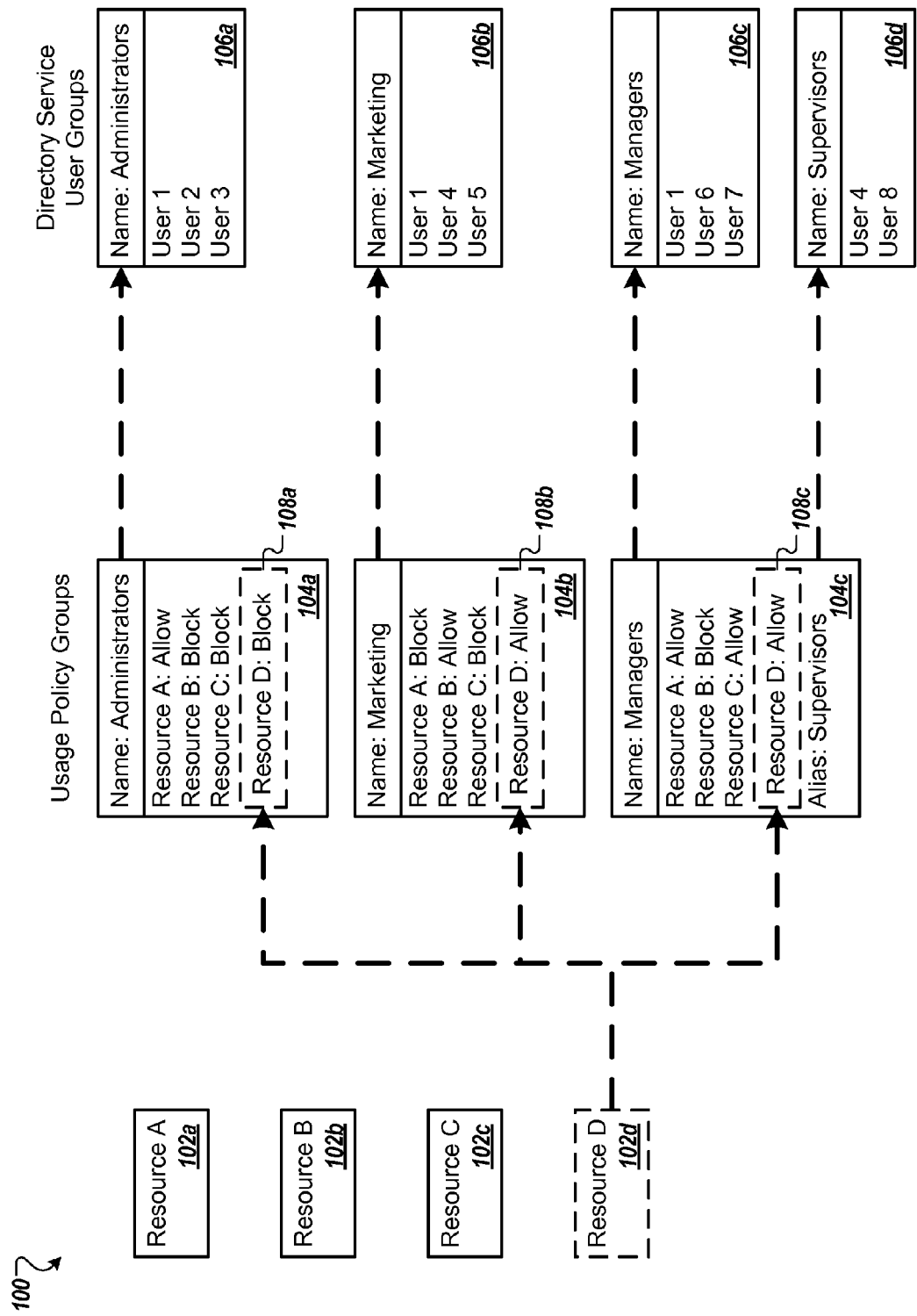
FIG. 1 is an example of a network system configured to update access permissions for a plurality of network users when a resource is added to the network system.

Some network security products extract a user's role in a network from a directory service to apply the correct network security policies for the user when the user accesses a network. For example, when an employee logs into their computer, the employee may be assigned an Acceptable Use Policy (AUP) for the Internet based on the employee belonging to the "Employee" user group or OU within the directory service. A manager may be allowed to access more content on the Internet based on the manager's belonging to the "Managers" user group or OU within the directory service.

Similarly, user access to internal network resource can be based on the user groups that a user belongs to in a directory service. For example, a network access controller can restrict access to internal resources (e.g., printers, file servers, etc.) based on a user's group or OU memberships within the directory service.

In order for the network resources (e.g., network security products, network access controllers, etc.) to determine network access permissions associated with a particular user, the network resources need to identify a mapping between user groups within a directory service and access policies for a network resource.

One technique that may be used to create this mapping involves an administrator visually selecting user groups from the directory service and selecting the equivalent policy from the network resource and creating a link between the two. Different network original equipment manufacturers may provide different methods of linking user groups to network resource access policies, making it more difficult for the administrator to create the links and for the administrator to remember which access policies for the network resource map to the equivalent directory service user group.

To reduce the burden on network administrators and implicitly link user groups with policy groups, the system and techniques described herein link a policy group for network resources to a user group in a directory service based on the policy group and the user group having the same human readable name. For example, when the directory service includes a "Managers" user group, naming a corresponding policy group "Managers" implicitly links the policy group to the user group. Similarly, when the directory service includes an "Executive Staff" user group, naming a corresponding policy group "Executive Staff" implicitly links the policy group to the user group and associates the corresponding access permissions defined in the "Executive Staff" policy group with the users in the "Executive Staff" user group.

Further, when two network resources need to communicate with each other regarding a specific user or a specific user device (e.g., to align policies for the specific user), the network resources can communicate using the directory service group name to which the specific user belongs, and which corresponds to the names of the usage policies for the network resources. This technique allows the two network resources to quickly and easily identify the usage policies to apply for the specific user or the specific user device.

When a single access control server includes policies for two or more directory services, a unique identifier for a specific directory service may be appended to the user group names in the specific directory service and the corresponding policy group names to allow name matching between the user group names and the policy group names. This allows multiple directory services to use the same group name, such as "Managers," while ensuring that the correct access permissions are associated with the users in the group (e.g., a manager associated with a first directory service will not gain unauthorized access to a resource that is accessible to a manager associated with a second directory service).

For example, when a first directory service is identified by the domain "@domain1" and a second directory service is identified by the domain "@domain2," the access control server may include domain specific policies for a managers user group where the policy groups are named "Managers@domain1" and "Managers@domain2" respectively.

Additionally, if the access control server includes one or more policies that apply to all user groups with the same user group name across all of the directory services, the access control server includes a policy group with a policy group name corresponding to the user group name but without the directory service unique identifier appended to the policy group name.

Continuing the previous example, when a first directory service is identified by the domain "@domain1" and a second directory service is identified by the domain "@domain2,"

the access control server may include a collective manager policy group, which applies to the managers in both directory services, named "Managers."

When a user requests access to a resource that is associated with two or more content categories, the system identifies a highest priority category and determines access permissions for the user to the resource based on the highest priority category. For example, as new resources, such as webpages, are associated with new content categories, such as "Educational Games," that are created from a combination of multiple base content categories, such as "Education" and "Games," the system determines which of the base content categories has the highest priority and applies a policy to the access request where the policy is associated with the highest priority base content category.

In one example, if an education content category has a higher priority than a game content category, the education content category is associated with an allow content action, and the game content category is associated with a block content action, when a user requests access to an "Educational Games" resource, the system determines that the base content categories associated with the resource are "education" and "games," that the education content category has a higher priority and education content should be allowed, and the system allows the user to access the educational games resource. Alternatively, if the game content category had a higher priority than the education content category, the system would have blocked the user's access to the educational games resource.

FIG. 1 is an example of a network system 100 configured to update access permissions for a plurality of network users when a resource is added to the network system 100. For example, when a resource 102a-d is added to the network system 100, the network system 100 updates one or more usage policy groups 104a-c with policies for the resource 102a-d, and the access permissions of users in one or more directory service user groups 106a-d are updated accordingly based on links between the usage policy groups 104a-c and the directory service user groups 106a-d, where the links are based on the names or aliases of the usage policy groups 104a-c being the same as the names of the directory service user groups 106a-d.

Each of the usage policy groups 104a-c initially includes a policy for each of the resources 102a-c. For example, the Administrators usage policy group 104a includes a policy that allows access to resource A 102a, a policy that blocks access to resource B 102b, and a policy that blocks access to resource C 102c. When a user 2 from the Administrators user group 106a requests access to one of the resources 102a-c, the network system 100 uses the Administrators usage policy group 104a to determine the access permissions of the user 2. For example, when the user 2 requests access to the resource A 102a, the network system 100 allows the user 2 to access the resource A 102a, and when the user 2 requests access to the resource B 102b, the network system 100 prevents the user 2 from accessing the resource B 102b, both based on the resource policies included in the Administrators usage policy group 104a.

When the network system 100 receives a resource request from a user, the network system selects a usage policy group associated with the user based on the user groups the user is associated with and, when the user is associated with multiple user groups, priority information associated with the user groups or the usage policy groups. For example, when the user 1 requests access to the resource C 102c, the network system 100 determines that the user 1 is included in Administrators user group 106a, the Marketing user group 106b, and the Managers user group 106c, that the Managers user group 106c has the highest priority (e.g., based on priority information associated with the usage policy groups or the user groups), and that the user 1 has access to the resource C 102c.

The Managers usage policy group 104c also includes a Supervisors alias that links the Managers usage policy group 104c with the Supervisors user group 106d. For example, the Managers usage policy group 104c is linked with the Managers user group 106c based on the Managers usage policy group 104c and the Managers user group 106c having the same name, "Managers." To allow the Managers usage policy group 104c to be linked with additional user groups, where the policies of the additional user groups are the same as the Managers user group 106c (e.g., when multiple roles in a directory service are similar but have different names), the network system 100 includes one or more aliases for the Managers usage policy group 104c, allowing the Managers usage policy group 104c to be implicitly linked to both the user groups that have the same name as the Managers usage policy group 104c (e.g., the Managers user group 106c) and that have the same name as one of the aliases as the Managers usage policy group 104c (e.g., the Supervisors user group 106d).

When the resource D 102d is added to the network system 100, the network system 100 creates one or more policies 108a-c for the resource D 102d where the policies 108a-c are included in one of the usage policy groups 104a-c respectively. For example, the network system 100 receives parameters from a computer operated by a network administrator and creates the policy 108a for the resource D 102d based on the parameters, where the parameters define access permissions to the resource D 102d for users in the Administrators user group 106a. The network administrator determines which user group is associated with the policy 108a based on the Administrators name of the Administrators usage policy group 104a, reducing the amount of time necessary for the network administrator to create the policy 108a.

Figure 2:
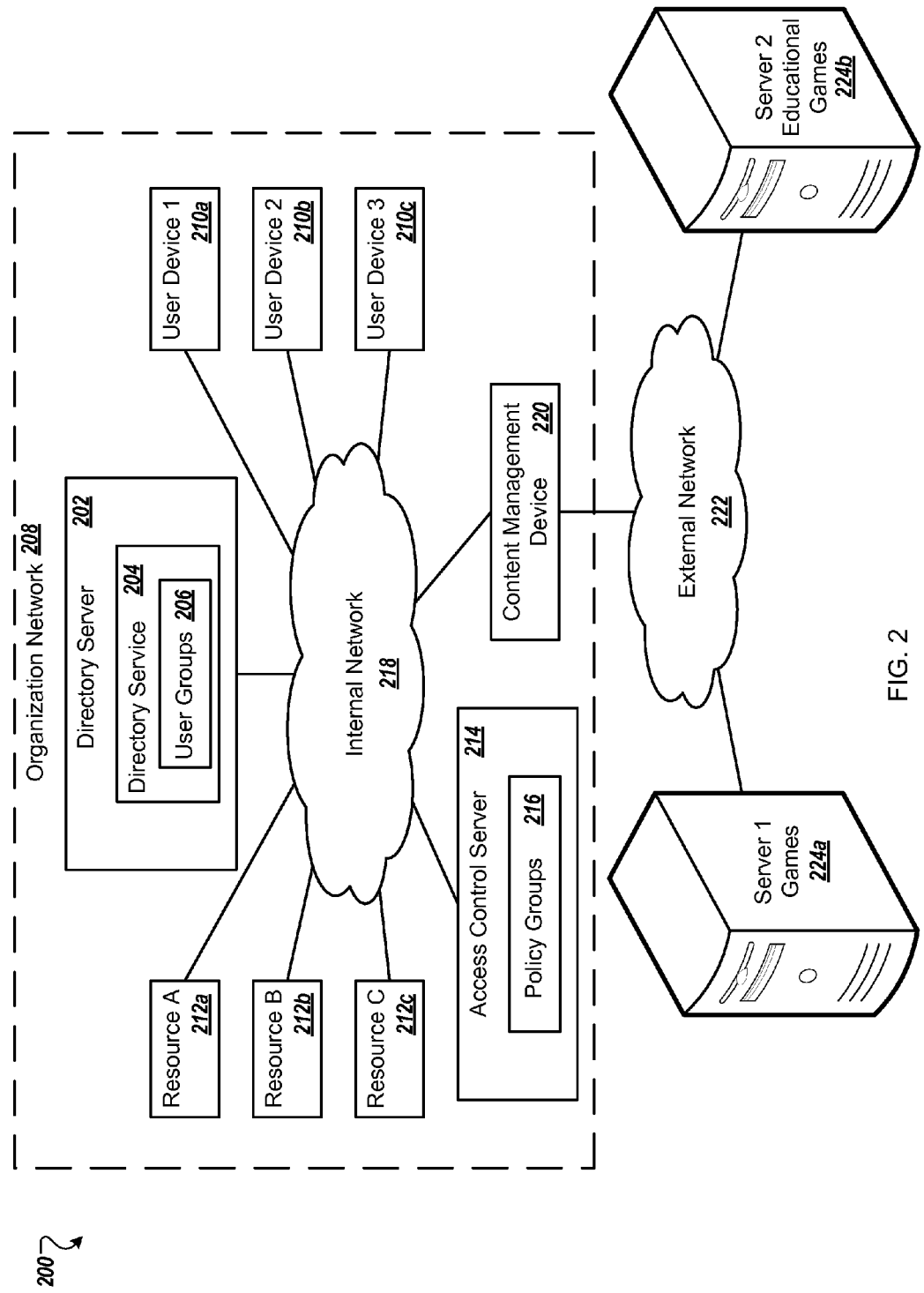
FIG. 2 is a block diagram of an environment in which policy groups are implicitly linked to corresponding user groups.

Based on the addition of the policies 108a-c for the resource D 102d to the usage policy groups 104a-c, the network system 100 updates access permissions for the users in the directory service user groups 106a-d, where the access permissions for each particular user are defined in the usage policy groups 104a-c that correspond to the user groups 106a-d which the particular user is a member of FIG. 2 is a block diagram of an environment 200 in which policy groups are implicitly linked to corresponding user groups. The policy groups define access permissions for users and/or user devices, which are included in the user groups, to network resources, where the network resources may be local or remote resources. For example, one policy can specify whether a specific user group has access to a particular local printer and another policy can specify whether the specific user group has access to a particular remote server.

The environment 200 includes a directory server 202 that runs a directory service 204 which includes information for one or more user groups 206 in an organization network 208. For example, the organization network 208 includes three user devices 210a-c, and each of the user devices 210a-c is associated with at least one of the user groups 206 (e.g., based on an identifier of the user device being included in the corresponding user groups in the directory service 204).

The user groups 206 may also include one or more usernames corresponding to users who may operate the user devices 210a-c. For example, each of the usernames is included in at least one of the user groups 206.

In some implementations, the directory service 204 includes information regarding one or more resources 212a-c included in the organization network 208. For example, the directory service 204 may include the type of each resource, a name for each resource, and other properties associated with each resource. A few examples of the resources 212a-c include volumes, folders, files, devices (e.g., printers, scanners, computers, etc.), telephone numbers and other objects.

An access control server 214 included in the organization network 208 stores one or more policy groups 216 which define access permissions for the user groups 206 to the resources 212a-c. Each of the policy groups 216 includes a name that matches a user group name corresponding to one of the user groups 206. At least one of the policy groups may include an alias that matches a user group name corresponding to one of the user groups 206. The policy groups 216 are linked to the user groups 206 based on a policy group name or a policy group alias for a particular policy group matching a user group name for a particular user group, such that the particular policy group is linked to the particular user group.

When the user device 210a accesses an internal network 218 included in the organization network 208, the access control server 214 determines the user groups 206 associated with the user device 210a (e.g., based on an identifier of the user device 210a or a username of the user operating the user device 210a included in one of the user groups 206) and the policy groups 216 associated with the user device 210a, where the policy groups 216 are determined based on a name or an alias of the policy groups 216 matching a name of one of the user groups 206 associated with the user device 210a.

The access control server 214 selects one of the policy groups 216 associated with the user device 210a and applies access permissions defined in the selected policy group to the resources 212a-c. For example, when the selected policy group is a Managers policy group that allows access to the resource 212a and the resource 212c, the access control server 214 allows the user device 210a to access the resources 212a and 212c while preventing the user device 210a from accessing the resource 212b.

When the user device 210a requests access to an external resource, a content management device 220 determines the access permissions for the user device 210a to the external resource based on the user groups 206 and the policy groups 216. For example, the content management device 220 connects the organization network 208 to an external network 222, allowing the user devices 210a-c to access one or more servers 224a-b. When the content management device 220 determines that the user device 210a has requested access the server 224a, the content management device 220 uses the policy groups 216 associated with the user device 210a to determine whether the user device 210a may be allowed to access the server 224a.

In one example, when the user device 210a connects to the internal network 218, the access control server 214 determines the user groups 206 associated with the user device 210a based on a device identifier or a username of the user operating the user device 210a, selects one of the policy groups 216 based on the user groups 206 associated with the user device 210a (e.g., based on priorities associated with the policy groups 216), and provides the selected policy group to the content management device 220. In this example, the selected policy group specifies that users in the user group which corresponds to the selected policy group (e.g., based on both groups having the same name) may access education content but may not access game content, where a priority of the education content category is higher than the game content category.

When the user device 210a requests access to the server 224a which contains content that is classified as game content, the content management device 220 uses the content categories associated with the server 224a to determine associated content categories in the selected policy group, and access permissions for the user device 210a to the server 224a. For example, the content management device 220 determines that the selected policy indicates that game content should be blocked and does not allow the user device 210a to access the server 224a.

When the user device 210a requests access to the server 224b which contains content that is classified as educational game content, the content management device 220 uses the content categories associated with the server 224b to determine associated content categories in the selected policy group, and access permissions for the user device 210a to the server 224b. For example, the content management device 220 determines that the education content category has a higher priority than the game content category, that the selected policy indicates that education content should be allowed, and allows the user device 210a to access the server 224b.

The content management device 220 may determine different access permissions for each of the user devices 210b-c based on the user groups 206 associated with the user devices 210b-c and the policy groups 216 that correspond to the user groups 206, based on the policy groups having the same name or alias as the names of the user groups 206 associated with the user devices 210b-c.

In some implementations, the content management device 220 determines the policy group associated with the user device 210a when the user device 210a requests access to the external network 222 and a resource connected to the external network 222. In these implementations, the content management device 220 requests the specific policy group for the user device 210a from the access control server 214 or determines the specific policy group for the user device 210a based on the user groups 206 and the policy groups 216.

In certain implementations, the access control server 214 prevents one or more of the user devices 210a-c from accessing at least one of the resources 212a-c. Alternatively, the resources 212a-c may prevent unauthorized access by the user devices 210a-c. For example, the resource 212a includes a local copy of the policies that define the access permissions for the resource 212a (e.g., where each of the policies is included in one of the policy groups 216). When the user device 210a requests access to the resource 212a, the resource 212a determines a user group associated with the user device 210a, determines the policy that corresponds to the user group, and determines access permissions of the user device 210a to the resource 212a based on the policy that corresponds to the user group.

Alternative methods for determining access permissions and providing policies to the resources 212a-c and the content management device 220 may be used in the environment 200. For example, when the user device 210a connects to the internal network 218, the content management device 220 may receive two or more of the policy groups 216 that are associated with the user device 210a, and determine which of the two or more of the policy groups 216 to use based on factors such as the requested content, the physical location of the user device 210a, and/or the amount of bandwidth available on the internal network 218, among others.

In some implementations, when the access control server 214 or the content management device 220 determines access permissions for the user devices 210a-c based on the physical location of the user devices 210a-c, the access control server 214 and the content management device 220 determine a general physical location for the user devices 210a-c based on an access device that one of the user devices 210a-c uses to connect to the internal network 218, using either a wired or wireless connection.

For example, when the user device 210a is a laptop, the content management device 220 determines that the user device 210a is physically located at a specific desk based on a network bridge to which the user device 210a is physically connected with an Ethernet cable, and applies a first policy group to communications between the user device 210a and other resources. When the content management device 220 determines that the user device 210a is located in a conference room, based on an IEEE 802.11 connection between the user device 210a and a wireless router, the content management device 220 applies a second policy group to communications between the user device 210a and other resources.

In one example, the content management device 220 allows the user device 210a to access a different universe of resources (e.g., more), such as web pages accessed using the external network 222, when the user device 210a is physically located at the specific desk as compared to when the user device 210a is physically in a conference room, e.g., to reduce the likelihood that a user in the conference room is distracted when attending a meeting. In another example, the content management device 220 allows the user device 210a to access more (and/or different) resources when the user device 210a is physically located in a conference room to allow the user device 210a to access resources that may be requested during a presentation that the user device 210a would not need to have access to (and/or should not be allowed to access) when physically located at the specific desk.

In some implementations, a network bridge or router determines domain specific information for the user device 210a. For example, when the user device 210a connects to a wireless router, the wireless router may append "@conferenceroom1" to a user group name associated with the user device 210a. The access control server 214 uses the user group name and the appended domain information to determine a policy group for the user device 210a. For example, when the user device 210a belongs to a Managers user group, the access control server selects a "Managers@conferenceroom1" policy group and applies policies from the "Managers@conferenceroom1" policy group to communications between the user device 210a and servers hosting resources requested by the user device 210a.

Alternatively, the access control server 214 determines domain specific information for the user device 210a based on the network bridge and/or the network router from which the access control server 214 receives resource requests. For example, the access control server 214 may include a list of domain information that associates requests from a network bridge with a first domain (e.g., "@office"), and requests from a wireless router with a second domain (e.g., "@conferenceroom1"). Based on the device from which the access control server 214 receives requests, the access control server 214 appends the corresponding domain information to the user group name associated with the requests.

The user devices 210a-c may include personal computers, mobile communication devices, and other devices that can send and receive data over the internal network 218. The internal network 218, such as a local area network (LAN), wide area network (WAN), the Internet, or a combination thereof, connects the directory server 202, the user devices 210a-c, the resources 212a-c, the access control server 214 and the content management device 220, where all of the devices connected to the internal network 218 are part of the same organization network 208.

The external network 222, such as a local area network (LAN), wide area network (WAN), the Internet, or a combination thereof, connects the content management device 220 and the servers 224a-b and otherwise provides access to resources that are not included in the organization network 208. For example, when the organization network 208 is a school network, the user devices 210a-c, the resources 212a, and the servers 224a-b are connected to the same local area network, the content management device 220 determines whether the user devices 210a-c have access to some or all of the content on the servers 224a-b (e.g., where each of the servers 224a-b serves multiple different types of content).

In some implementations, the user group names and the policy group names include distinguished names. For example, when a tree in the directory service 204 includes "domain1" as the root, with consecutively nested nodes "local" and "Staff" below the root node, and the Staff organizational unit includes a Managers user group, the distinguished name for the Managers user group may be "dc=domain1,dc=local,ou=Staff,ou=Managers."

The use of distinguished names allows the directory service 204 to include multiple organizational units or user groups (e.g., user roles) with the same name while associating different policy groups with the user groups. The user groups that have the same name may be associated with a single organization (e.g., a Managers user group for users located in Boston and a Managers user group for users located in San Diego) or may be associated with two different organizations (e.g., a first company and a second company). For example, when the organization network 208 is used for two separate organizations, where the domain of the first organization is "domain1" and the domain of the second organization is "domain2," the directory service 204 may include two Managers user groups where the distinguished names for the user groups are "dc=domain1,dc=local,ou=Staff,ou=Managers" and "dc=domain2,dc=local,ou=Staff,ou=Managers" corresponding to the first organization and the second organization respectively (e.g., where "dc" represents a domain component and "ou" represents an organizational unit).

This allows a single directory server 202 and a single access control server 214 to include the user groups 206 and the policy groups 216 for both organizations where both organizations may have separate user groups with the same name and different users, and the user groups with the same name are associated with different policy groups.

In some implementations, the directory server 202 and the access control server 214 are included on the same computer. For example, a single computer executes the directory service 204 and includes the policy groups 216.

In some implementations, the access control server 214 and the content management device 220 are included in the same computer. For example, a single computer stores the policy groups 216 in memory and determines whether the user devices 210a-c have access to external resources on the external network 222.

FIG. 3 is an example of a policy group overview user interface 300. The policy group overview user interface 300 allows a network administrator to create policy groups and assign alias names and priorities to the policy groups.

For example, the policy group overview user interface 300 includes a list 302 of policy groups associated with an organization network. The list 302 includes one or more policy group entries 304a-b that each define a policy group that is associated with one or more user groups (e.g., from the user groups 206).

A policy group name input field 306a-b allows a network administrator to enter the name of the corresponding policy group. When the policy group is added to the system (e.g., when the policy group is stored on the access control server 214), the policy group is linked to all user groups that have the same name as the policy group.

An alias name input field 308*a-b* allows a network administrator to enter alias names for the corresponding policy group. Similar to the policy group name, when the policy group is added to the system, the policy group is linked to all user groups that have the same name as one of the alias names for the policy group, allowing a single policy group to be associated with multiple user groups where the access permissions for all of the multiple user groups are the same.

The policy group overview user interface 300 includes a priority input field 310*a-b* for each of the corresponding policy groups. The priority input fields 310*a-b* allow a network administrator to assign a priority to each of the policy groups so that when the access control server 214 determines that a single user is included in multiple user groups, the access control server 214 selects the policy groups associated with the single user based on matching the names of the user groups with policy group names or policy alias names, and determines the highest priority policy group based on the selected policy group that has the greatest numerical priority value. The access control server 214 may then determine access permissions for the single user based on the highest priority policy group.

Alternatively, the access control server 214 determines that the selected policy group that has the lowest numerical priority value as the highest priority policy user group for the single user.

In certain implementations, the access control server 214 assigns the policy groups a numerical priority value based on the location of the corresponding policy group entry in the list 302. For example, the default policy group entry 304*a* is the first entry in the list 302 and is assigned the highest priority, the managers policy group entry 304*b* is the second entry in the list 302 and is assigned the second highest priority, and so on.

In some implementations, when a policy group for a particular user does not specify access permissions for a particular resource, the resources 212*a-c*, the access control server 214, and/or the content management device 220 use a default policy group to determine the particular user's access permissions for the particular resource. The default policy group may specify that access to all resources is blocked unless specified by another policy group, or that access to some resources is allowed while access to other resources is blocked.

For example, the access control server 214 may include a Manager policy for the particular resource in the Managers policy group, while the Marketing policy group does not include a Marketing policy for the particular resource. When a user in the marketing group who is associated with the Marketing policy group requests access to the particular resource, the access control server 214 determines a default policy for the particular resource and uses the access permissions specified by the default policy for the particular resource to determine access permissions for the marketing user to the particular resource (assuming that no other policy group has a higher priority than the Marketing policy group for the marketing user).

All of the policy group names and the alias names are presented in the policy group overview user interface 300 in a human readable format. For example, the characters presented in the policy group name input fields 306*a-b* and the alias name input fields 308*a-b* are stored in an ASCII or Unicode character-encoding scheme on a memory included in the access control server 214.

In some implementations, the policy group overview user interface 300 is presented on a user device associated with a network administrator. This allows the network administrator to create new policy groups, create new policies for a particular resource, update a policy group, and/or update a policy for a particular resource. For example, the user device presents the policy group overview user interface 300 to the network administrator, receives input from the network administrator indicating a new policy group or an update to a policy group, provides information regarding the input to the access control server 214, and the access control server 214 updates the policy groups 216 based on the information received from the network administrator's user device.

In certain implementations, the access control server 214 authenticates the network administrator. For example, prior to providing instructions for the presentation of the policy group overview user interface 300 to the network administrator's user device, the access control server 214 receives credentials for the network administrator from the network administrator's user device, authenticates the credentials for the network administrator, and, based on determining that the network administrator's credentials are valid, associates the user device with a user account of the network administrator.

Figure 4:
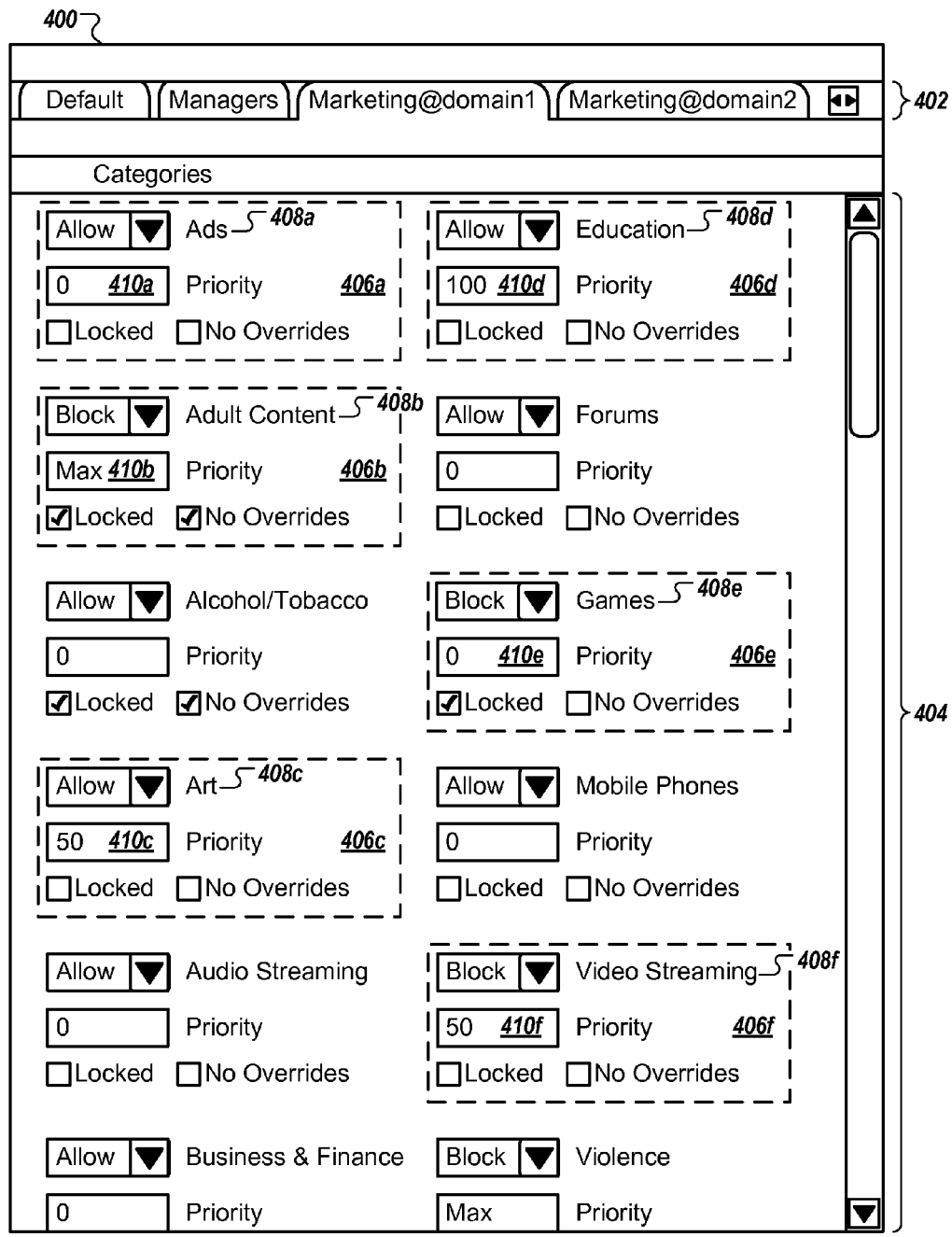
FIG. 4 is an example of policy group details user interface.

FIG. 4 is an example of policy group details user interface 400. For example, after a network administrator creates a policy group using the policy group overview user interface 300, the network administrator may use the policy group details user interface 400 to adjust specific policies and access permissions for the created policy group.

The policy group details user interface 400 includes a policy group selection list 402 that allows the network administrator to view the names of the policy groups stored in the access control server 214, where the policy group names presented in the policy group selection list 402 are used to link the respective policy groups with corresponding user groups stored in the directory server 202.

Upon selection of a policy group from the policy group selection list 402, the policy group details user interface 400 presents a policy menu 404 that allows the network administrator to specify one or more policies for the selected policy group. For example, when the policy group details user interface 400 determines that the network administrator selected the "Marketing@domain1" policy group, the policy group details user interface 400 presents one or more policy entries 406*a-f* in the policy menu 404 where the policy entries 406*a-f* are associated with the selected "Marketing@domain1" policy group.

Presentation of the policy group selection list 402 and the policy menu 404 allows a user (e.g., network administrator) accessing the policy group details user interface 400 to adjust the policy entries 406*a-f*, or to create new policy entries, and determine to which users the policy entries apply without switching between different user interfaces. For example, the user can determine that the policy entries 406*a-f* are associated with users in the "Marketing@domain1" user group and that selection of the "Managers" tab or "Marketing@domain2" tab would present different policy entries that are associated with the respective user group. This allows presentation of both a selected policy group name and the network access policies associated with the selected policy group name in the same user interface (i.e., where the associated user group name is the same as the selected policy group name). Further, this may allow both the selected policy group name and some of the network access policies associated with the selected policy group name to be presented at the same time in a single user interface.

Each of the policy entries 406a-f includes a content category 408a-f that indicates the types of content associated with the respective policy. For example, the Ads content category 408a indicates that any content requests from users in the Marketing@domain1 user group for advertisements should be associated with the ad policy entry 406a and that the content management device 220 will use information associated with the ad policy entry 406a to determine whether to allow or block advertisement content.

Each of the policy entries 406a-f includes a permission selection that allows a network administrator to specify access permissions for the corresponding policy. For example, the ad policy entry 406a has a permission selection of "Allow" indicating that when the content management device 220 determines that a user request is for advertisement content, the user will be allowed to access the requested advertisement content. If the network administrator selects the permission selection for the ad policy entry 406a and changes the permission setting to "Block," when the content management device 220 determines that a user request is for advertisement content, the user will not be allowed to access the requested advertisement content.

A priority field 410a-f corresponding to each of the policy entries 406a-f allows a network administrator to specify a priority for each of the policy entries 406a-f. For example, when a user requests content that is associated with two or more content categories, the content management device 220 determines which of the content categories has the highest priority and, based on the content category with the highest priority, uses the corresponding access permissions to determine whether to allow or block the requested content. Other methods than the use of the priority fields 410a-f may be used to assign each of the policy entries 406a-f a priority.

In one example of determining content permissions, when a user device associated with the Marketing@domain1 user group requests educational game content, the content management device 220 receives information for the Marketing@domain1 policy group from the access control server 214, determines that the education policy has a priority of 100 and the game policy has a priority of 0 and, based on higher numbers indicating a higher priority, the content management device 220 determines that educational game content should be allowed.

In another example, when a user device associated with the Marketing@domain1 user group requests game content, the content management device 220 determines that the access permissions associated with the game policy are "Block" based on the "Block" permission selection in the game policy entry 406e, and blocks the requested content.

In some implementations, a network administrator may enter a system variable in one of the priority fields 410a-f. For example, when the network administrator enters "Max" in the priority field 410b, the content management device 220 determines that the adult policy always has the highest priority and, based on the "Block" permission selection in the adult policy entry 406b, that adult content should always be blocked.

The policy group details user interface 400 may include other variables in addition to a maximum value variable. For example, a minimum value variable may indicate that a specific policy should always have the lowest priority no matter what numerical values are entered in the other priority fields.

If another policy group is selected, the policy menu 404 may present policy entries similar to the policy entries 406a-f, where the details of the policy entries may be different. For example, the content categories 408a-f may be the same while the permission selections and the numerical values entered in the priority fields 410a-f are different for the two different policy groups.

In some implementations, policies associated with lower numerical values have a higher priority. For example, a policy entry with a priority of −5 may have a higher priority than a policy with a priority of 128.

When the content management device 220 determines that two content categories associated with a content request have the same priority, the content management device 220 determines permissions based on the most restrictive permissions associated with the content categories. For example, when the content management device 220 receives a request for video streaming art content and determines that both the "video streaming" content policy and the "art" content policy have the same priority (e.g., a priority of 50), the content management device 220 determines that the video streaming content policy is more restrictive (e.g., where blocking content is more restrictive than allowing content), and blocks the requested content.

Alternatively, if the video streaming policy entry 406f indicates that video streaming content should be allowed but that the bandwidth for the content should be limited, when the content management device 220 determines that a request is for video streaming art content, the content management device 220 limits the bandwidth of the video streaming content that is provided to a user device.

In implementations where the environment 200 includes information for multiple organizations, the policy names presented in the policy group selection list 402 include domain information or a distinguished name. For example, when two organizations both include a Marketing user group, the domain information "@domain1" is appended to the end of the policy group name for the policy group corresponding to the first organization and the domain information "@domain2" is appended to the end of the policy group name for the policy group correspond to the second organization.

In these implementations, when user group information received by the access control server 214 corresponds to two or more directory services where each directory service includes a plurality of network users and a unique directory service identifier, and each user group in a specific one of the directory services has a user group name that is unique among the plurality of user groups in the specific directory service, the access control server 214 matches a user group name with a policy group name based on both the user group name and the policy group name having the same unique directory service identifier (e.g., "@domain1") in addition to the rest of the user group name and the policy group name being the same.

When domain specific information is included in a policy group name or a policy group alias, only the user group or user groups that exactly match the policy group name or the policy alias are linked to the policy group corresponding to the policy group name or the policy group alias. For example, when the directory server 202 includes a Marketing@domain1 user group and a Marketing@domain2 user group, then a Marketing@domain1 policy group is only linked to the Marketing@domain1 user group and not the Marketing@domain2 user group.

In some implementations, if the directory server 202 includes a Marketing@domain1 user group and a Marketing@domain2 user group, when a network administrator creates a Marketing policy group, the Marketing policy group is associated with both the Marketing@domain1 user group and the Marketing@domain2 user group. In these implementations, when the directory server 202 has two Marketing user groups, the access control server 214 may have three policy groups with a Marketing policy group name, where each of the policy groups has a different domain. For example, a Marketing policy group that does not include any domain information is associated with policies that apply to users in both the Marketing@domain1 user group and the Marketing@domain2 user group, a Marketing@domain1 policy group is associated with policies for only the users in the Marketing@domain1 user group, and a Marketing@domain2 policy group is associated with polices for only the users in the Marketing@domain2 user group. This allows the Marketing policy group to define permissions for resources shared between the users in both domains, while the domain specific policy groups define permissions for the resources that are only available to the users in a specific one of the domains.

In one example, when the user group information corresponds to two or more directory services where each directory service includes a plurality of network users and each user group in a specific one of the directory services has a user group name that is unique among the plurality of user groups in the specific directory service, the access control server 214 links the user groups corresponding to a user group name with the policy group corresponding to a policy group name that matches the user group name such that the one or more network users in the linked user groups are subject to the usage policies associated with the linked policy group where each of the linked user groups included in a different one of the directory services. For example, when the policy group name is Marketing, and the user group names are Marketing@domain1 and Marketing@domain2, the access control server 214 links the Marketing@domain1 user group with the Marketing policy group and links the Marketing@domain2 user group with the Marketing policy group.

In some implementations, when the directory server 202 includes two directory services for two different organizations, when a specific group name is not included in both directory services, a group name for a policy group corresponding to the specific group does not need to include domain specific information. For example, when a first organization includes a Managers user group and the second organization does not, a network administrator may create a Managers policy group where the "Managers" name does not include domain specific information because there is only one Managers user group in the directory server 202.

In these implementations, if a Managers user group is created for the second organization, the access control server 214 automatically updates the name of the original Managers policy group to include domain information. Continuing with the previous example, when the access control server 214 determines that a second Managers user group is created in the directory server 202, the access control server 214 changes the name of the Managers policy group to Managers@domain1 prior to the creation of a second Managers policy group that corresponds to the new Managers user group, where @domain1 is associated with the first organization.

In some implementations, when the environment 200 includes two user roles with the same name, the access control server 214 links the user roles with policy groups based on a unique partial distinguished name for a portion of the directory service 204 that includes the respective user role. For example, when the environment 200 includes two or more directory services, where each directory service includes a plurality of network users and a unique partial distinguished name for a portion of the directory service, each user role in a specific one of the directory services has a user role name that is unique among the plurality of user roles in the specific a portion of the directory service. In that case, the access control server 214 matches user role names and policy group names that both include the same partial distinguished name.

In some implementations, the access control server 214 or the content management device 220 applies content restrictions on a resource level. For example, if a user device requests access to a particular web page hosted on a server or another specific resource (e.g., a printer), the content management device 220 determines access permissions for the user device to the particular web page based on the content categories associated with the particular web page and not the content categories that are associated with other content hosted on the server.

In certain implementations, the access control server 214 or the content management device 220 applies content restrictions on a request level. For example, if a user device requests access to a particular web page where the particular web page includes multiple components (e.g., advertisements, images, text fields, etc.), the content management device 220 determines access permissions for each of the multiple components, allowing the user device to receive some portions of the web page while not receiving others. For example, the content management device 220 may allow the user device to receive a news article while blocking advertisements that are categorized as violent and/or having adult content and which would have been presented with the news article otherwise.

In some implementations, the policy group details user interface 400 may be part of the same user interface as the policy group overview user interface 300. For example, a network administrator may enter a name and an alias for a policy group and specify specific network permissions for the policy group on the same user interface.

In some implementations, the policy group details user interface 400 includes details about all of the user groups implicitly linked to the displayed policy group. For example, the policy group details user interface 400 includes one or more alias names below the policy group selection list 402. This allows a user to view both the user group name associated with the policies presented in the policy entries 406*a-f*, and aliases for additional user groups that are associated with the same policy entries 406*a-f*.

In some implementations, the policy group details user interface 400 includes additional controls for specifying specific network policies for a policy group. For example, the policy group details user interface 400 includes a network resource field that allows a network administrator to select a specific network resource, such as a printer, by the name of the resource or an address for the resource, and a corresponding network resource permissions field that allows the network administrator to specify specific permissions (e.g., allow or block) for the users in the user group corresponding to the policy group (e.g., based on the same name for both groups) when accessing the network resource.

Figure 5:
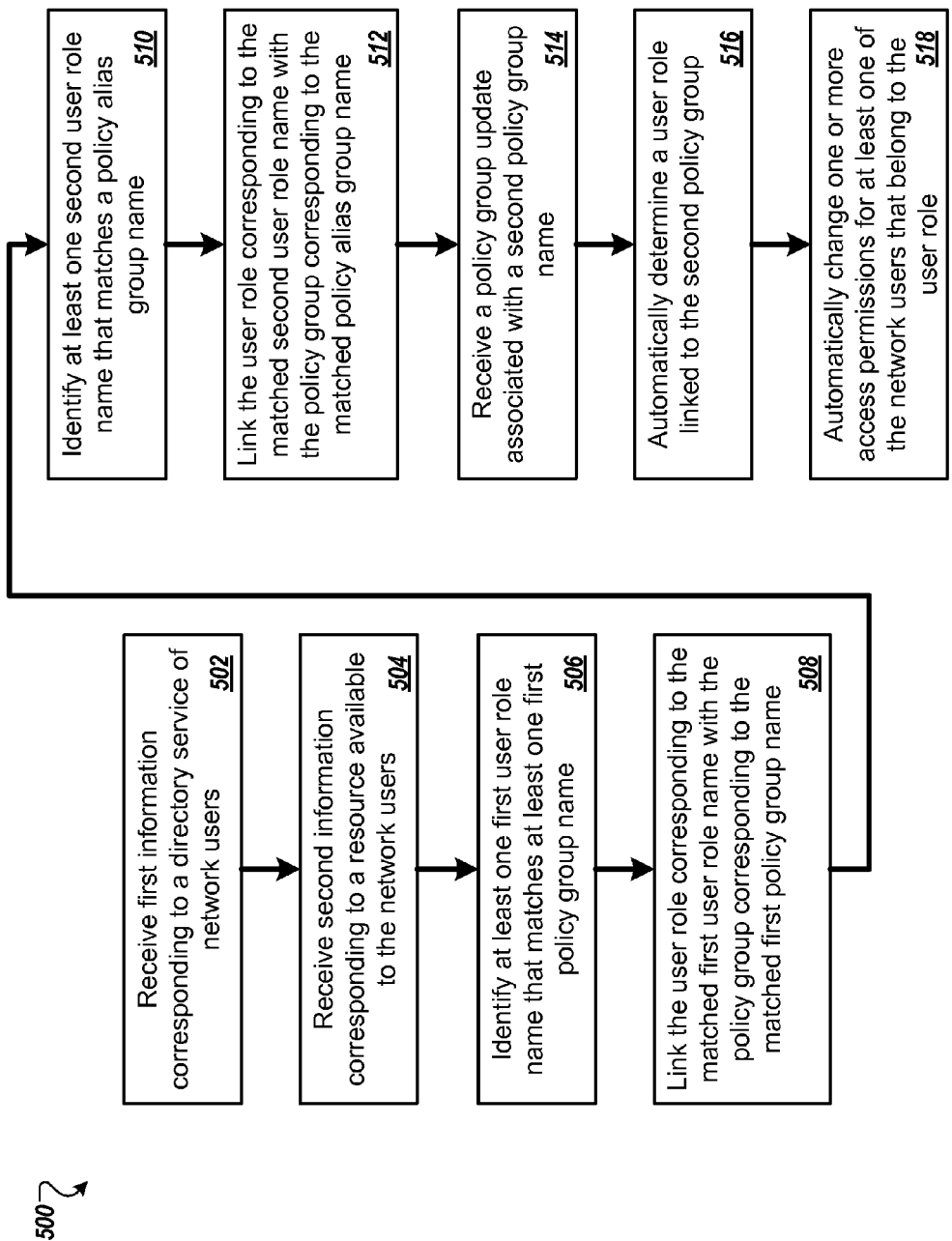
FIG. 5 is a flow diagram of a process for linking a user group to a policy group.

FIG. 5 is a flow diagram of a process 500 for linking a user role to a policy group. The process 500 can be used by the access control server 214 from the environment 200.

The access control server receives first information corresponding to a directory service of network users (502). The directory service is configured to organize the network users into a plurality of user roles where each network user is associated with one or more user roles and each user role has a user role name that is unique among the plurality of user roles. For example, the directory service includes a Managers user group, an Administrators user group, and a Marketing user group, and the access control server receives the first information, including information for the Mangers user group, the Administrators user group, and the Marketing user group, from the directory server. Alternatively, the access control server receives the first information, including information for a Managers organizational unit, an Administrators organizational unit, and a Marketing organizational unit from the directory server.

The access control server receives second information corresponding to a resource available to the network users (504). The resource is associated with a plurality of policy groups where each policy group has one or more associated usage policies and a policy group name that is unique among the plurality of policy groups. For example, the access control server retrieves the second information from the policy groups or receives the second information from a user interface presented to a network administrator.

The access control server identifies at least one first user role name that matches at least one first policy group name (506). For example, the access control server determines that the network administrator created a Managers policy group and that the name of the Managers user group matches the name of the Managers policy group. Alternatively, the access control server may identify a first user group name that matches a policy group alias.

The access control server may match either full distinguished names or partial distinguished names when linking the first role name with the first policy group name. For example, when the directory service includes two or more instances of the same user role name associated with a different set of users (e.g., Managers in Boston and Managers in San Diego), the access control server may identify the first user role name (e.g., "ou=Managers,dc=Boston") and the first policy group name using partial distinguished names associated with the first user role and the first policy group, respectively.

The access control server links the user role corresponding to the matched first user role name with the policy group corresponding to the matched first policy group name (508), such that the one or more network users in the linked user role are subject to the usage policies associated with the linked policy group. For example, the access control server links the Managers user group with the Managers policy group such that the network users in the Managers user group are subject to the usage policies defined by the Managers policy group. Alternatively, when the user roles are organizational units, the access control server links the Managers organizational unit with the Mangers policy group.

The access control server identifies at least one second user role name that matches a policy alias group name (510). For example, the access control server determines that the Managers policy group includes a Supervisors alias that matches the name of a Supervisors user group.

The access control server links the user role corresponding to the matched second user role name with the policy group corresponding to the matched policy alias group name (512), such that the one or more network users in the linked user role are subject to the usage policies associated with the linked policy group. For example, the access control server links the Supervisors user group with the Managers policy group based on the match between the alias name and the user group name. Alternatively, when the user roles are organizational units, the access control server links the Supervisors organizational unit with the Managers policy group based on the match between the alias name and the organizational unit name.

The access control server receives a policy group update associated with a second policy group name (514). The second policy group name is for a second policy group that is one of the plurality of policy groups and the policy group update indicates a change to one or more of the usage policies in the policy group. For example, the access control server determines that a network administrator changed one of the policies included in the Managers policy group by changing video streaming content from blocked to having a limited bandwidth.

The access control server automatically determines a user role linked to the second policy group (516). The second policy group is identified based on a user role name of the user role matching the second policy group name. For example, the access control server determines that the Managers user group and the Supervisors user group are linked to the Managers policy group, where the Supervisors user group is linked to the Managers policy group based on a Supervisors alias included in the Mangers policy group.

The access control server automatically changes one or more access permissions for at least one of the network users that belong to the user role linked to the second policy group (518). The changes to the access permissions are based on the policy group update. For example, the access control server determines that the users in both the Managers user group and the Supervisors user group now have access to streaming video content and that the bandwidth of the streaming video content will be limited as defined by the Managers policy group.

The order of steps in the process 500 described above is illustrative only, and the linking of a user group to a policy group can be performed in different orders. For example, the access control server can receive the second information prior to receiving the first information.

In some implementations, the process 500 can include additional steps, fewer steps, or some of the steps can be divided into multiple steps. For example, the access control sever may perform steps 502 through 508 without performing the steps 510 through 518. In one example, the access control server may perform the steps 502 through 512 without performing the steps 514 through 518. In another example, the access control server performs the steps 502 through 508 and 514 through 518 without performing steps 510 or 512.

Figure 6:
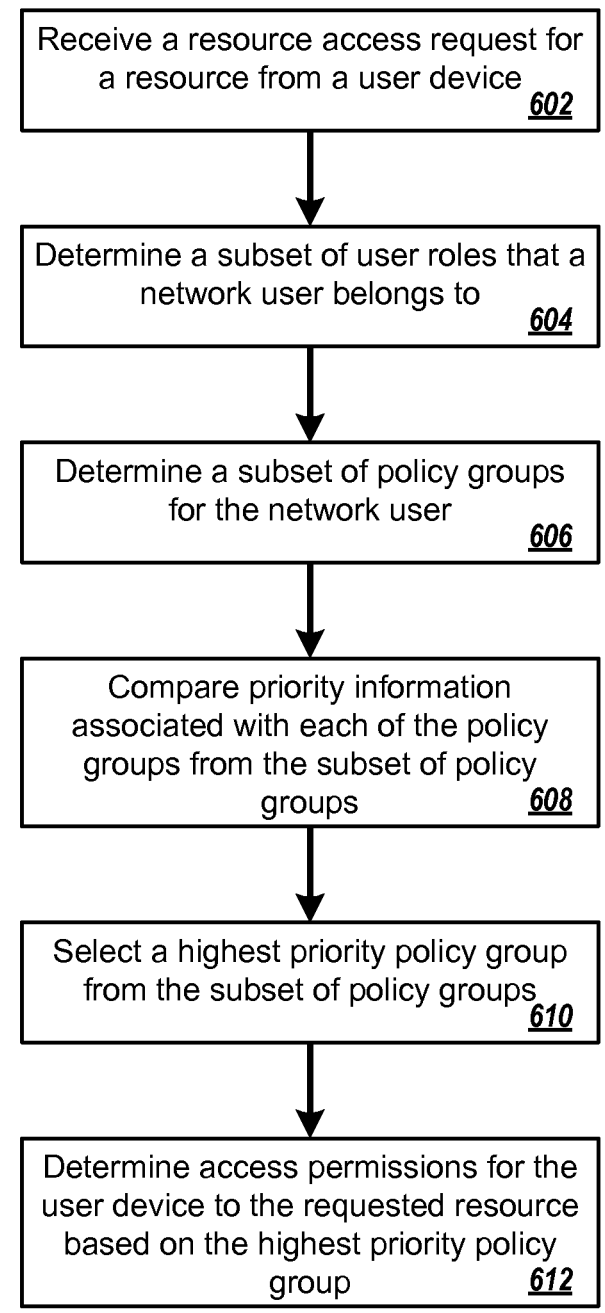
FIG. 6 is a flow diagram of a process for determining resource access permissions for a user device.

FIG. 6 is a flow diagram of a process 600 for determining resource access permissions for a user device. The process 600 can be used by the access control server 214 from the environment 200. Alternatively, other devices or a combination of devices from the environment 200 may perform the process 600. For example, the content management device 220, alone or in combination with the access control server 214, may perform the process 600.

The access control server receives a resource access request for a resource from a user device (602) where the user device associated with a network user. For example, the access control server receives a resource request from the first user device where the first user device is requesting access to the resource A (e.g., a network directory).

The access control server determines a subset of user roles that a network user belongs to (604). For example, based on credentials associated with the first user device (e.g., where the credentials were entered by the network user), the access control server determines that the first user device belongs to the Administrators user group and the Managers user group. Alternatively, when the user roles are organizational units, the access control server determines that the first user device belongs to the Administrators organizational unit and the Managers organizational unit.

In implementations when the process 600 is performed with the process 500, at least one of user roles in the subset of user roles is one of the plurality of user roles. For example, the first information received by the access control server corresponds to a directory service of network users organized into the plurality of user roles where at least one of the user roles in the subset of user roles is one of the user roles from the plurality of user roles. In one example, when a Marketing user group, a Managers user group, and a Network Administrators user group are linked to respective policy groups associated with the network directory, at least one of the user groups (e.g., the Managers user group) is linked to a policy group (e.g., the Mangers policy group) that is associated with the resource (e.g., the network directory) and is included in the plurality of user groups.

The access control server determines a subset of policy groups for the network user (606). Each policy group in the subset of policy groups has priority information and is linked to at least one of the user roles from the subset of user roles and each user role in the subset of user roles is linked to one of the policy groups from the subset of policy groups.

For example, the access control server determines that the Managers user group is linked to the Managers policy group and that the Administrators user group is linked to the Administrators policy group and selects the Managers policy group and the Administrators policy group as the subset of policy groups for the network user. Additionally, the access control server may determine that the Managers policy group has a priority of 1000 and that the Administrators policy group has a priority of 525.

In implementations when the process 600 is performed with the process 500, at least one policy group in the subset of policy groups is one of the plurality of policy groups. For example, the second information received by the access control server corresponds to a resource available to the network users and associated with a plurality of policy groups, where at least one of the policy groups in the subset of policy groups is from the plurality of policy groups. Continuing the example above, when a Marketing policy group, a Managers policy group, and a Network Administrators policy group are associated with the network directory, at least one of the policy groups (e.g., the Managers policy group) is associated with the resource and is included in the plurality of policy groups and in the subset of policy groups.

The access control server compares priority information associated with each of the policy groups from the subset of policy groups (608). For example, the access control server compares the Managers policy group priority of 1000 with the Administrators policy group priority of 525. Any comparison algorithm may be used to compare the priority information associated with each of the policy groups. For example, the access control server may rank the policy groups in the subset of policy groups according to their priority value (e.g., from highest priority to lowest priority).

The access control server selects a highest priority policy group from the subset of policy groups (610), where the highest priority policy group has a higher priority than the other policy groups in the subset of policy groups based on the priority information associated with the highest priority policy group. For example, the access control server selects the Managers policy group with a priority of 1000.

Alternatively, when lower numerical priority values represent a higher priority, the access control server selects the Administrators policy group. The access control server may use other algorithms or values to represent the priority of the policy groups in the subset of policy groups. For example, the policy groups may have priorities of "high," "medium," and "low," to name a few.

The access control server determines access permissions for the user device to the requested resource based on the highest priority policy group (612). For example, the access control server selects a policy from the Managers policy group where the policy is associated with the specific network directory the user device requested access to. The access control server may then apply the access permissions specified by the determined policy to allow or block the user device's access to the requested network directory.

The order of steps in the process 600 described above is illustrative only, and the determining of resource access permissions for a user device can be performed in different orders. For example, the access control server can determine a subset of user roles that a network user belongs to prior to receiving a resource access request from a user device operated by the network user.

In some implementations, the process 600 can include additional steps, fewer steps, or some of the steps can be divided into multiple steps. For example, the access control server may compare the priority information and select the highest priority policy group in a single step. In one example, the process 600 is performed after the process 500 by the same device or by another device in the environment 200.

Figure 7:
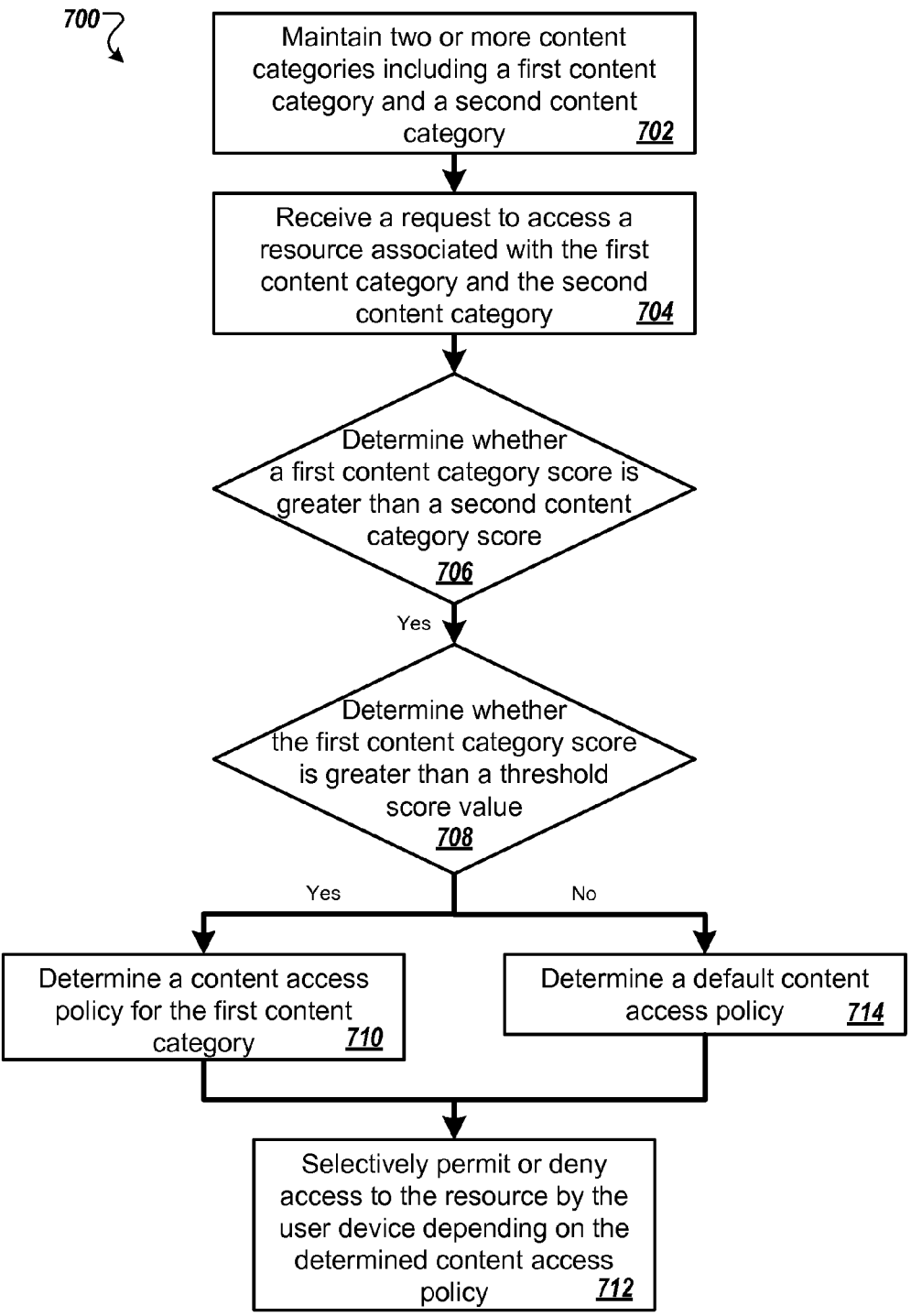
FIG. 7 is a flow diagram of a process for determining a content access policy associated with a user device resource request.

FIG. 7 is a flow diagram of a process 700 for determining a content access policy associated with a user device resource request. The process 700 can be used by the content management device 220 from the environment 200.

The content management device maintains two or more content categories including a first content category and a second content category (702), each content category having an associated score. For example, the content management device receives a policy group from the access control server where the policy group includes access permissions for the two or more content categories and the scores associated with the content categories. The content management device may receive the policy group, such as a Managers policy group, based on the access control server determining that at least one user device associated with the policy group is connected to the internal network. In one example, the policy group includes access permissions for an ads content category with a priority score of 0, an education content category with a priority score of 100, a games content category with a priority score of 0, and a video streaming content category with a priority score of 50, among others.

Alternatively, the content management device may receive the two or more content categories from a memory included in the content management device.

The content management device receives a request for access to a resource associated with the first content category and the second content category (704). For example, the content management device receives a resource request from the user device, identifies a server that hosts the resource, and receives identification of the first and the second content categories from the server, where the first and the second content categories indicate the type of content requested by the resource request. In one example, when the requested resource is an educational game resource, the first and the second content categories are an education content category and a game content category. The content management device may use any algorithm to determine the first and the second content categories associated with the resource.

The content management device determines whether a first content category score is greater than a second content category score (706) where the first content category score is associated with the first content category and the second content category score is associated with the second content category. For example, the content management device determines that the education content category priority score of 100 is greater than the game content category score of 50.

Based on determining that the first content category score is greater than the second content category score, the content management device determines whether the first content category score is greater than a threshold score value (708). For example, the content management device compares the education content category priority score of 100 with the threshold score value.

Based on determining that the first content category score is greater than the threshold score value, the content management device determines a content access policy for the first content category (710). The content access policy defines access permissions for the user device to the resource. For example, the content management device selects a Managers education content access policy associated with the education content category in the Managers policy group, and determines that the user device may access the requested educational game resource.

The content management device selectively permits or denies access to the resource by the user device depending on the determined content access policy (712). For example, the content management device allows the user device to access the requested education game resource. Alternatively, if the content management device determined that the game content category score was greater than the education content category score, and that game content access policy is associated with a block content action, the content management device prevents the user device from accessing the resource.

Based on determining that the first content category score is not greater than the threshold score value, the content management device determines a default content access policy (714). For example, the content management device selects a default content access policy from the Managers policy group or from a Default policy group and determines the access permissions of the user device to the requested resource based on the default content access policy. The content management device then selectively permits or denies access to the resource based on the default content access policy by performing step 712.

In some implementations, the threshold score value is selected by the content management device or the access control server to prevent the user device from accessing one or more specific network resources too often. For example, the first time the user device accesses the educational game resource the threshold score value is 0, the second time the user device accesses the educational game resource the threshold score value is 50, and the third time the user device attempts to access the educational game resource the threshold score value is 100, where the third request by the user device to the educational game resource is blocked. Any algorithm may be used to determine the threshold score value, where the threshold score value may be a static or dynamic value, based on one or more previous requests made by the user device, and for specific types of content accessed by the user device, among others.

The order of steps in the process 700 described above is illustrative only, and the selecting of the content access policy can be performed in different orders. For example, the content management device can determine whether the first content category score is greater than the threshold score value before determining whether the first content category score is greater than the second content category score.

In some implementations, the process 700 can include additional steps, fewer steps, or some of the steps can be divided into multiple steps. For example, the content management device may perform the steps 702 through 706, step 710, and step 712 without performing steps 708 or 714. For example, the content management device determines which of the first and the second content categories has the highest priority and applies a content access policy associated with the highest priority content category without comparing the priority score of the highest priority content category with the threshold score value.

In certain implementations, when multiple content categories are associated with the same priority score value, the content management device selects the content access policy with the most restrictive access permissions. For example, when both the education content category and the game content category have the same score, and both the education content access policy and the game content access policy allow access to requested resources, the content management device will allow the user device to access the requested content. If, however, the education content access policy allows access to requested resources but the game content access policy blocks access to requested resources or limits the bandwidth for connections to requested resources, among other restrictive access policies, the content management device applies access permissions from the game content access policy to the user device's resource request.

Figure 8:
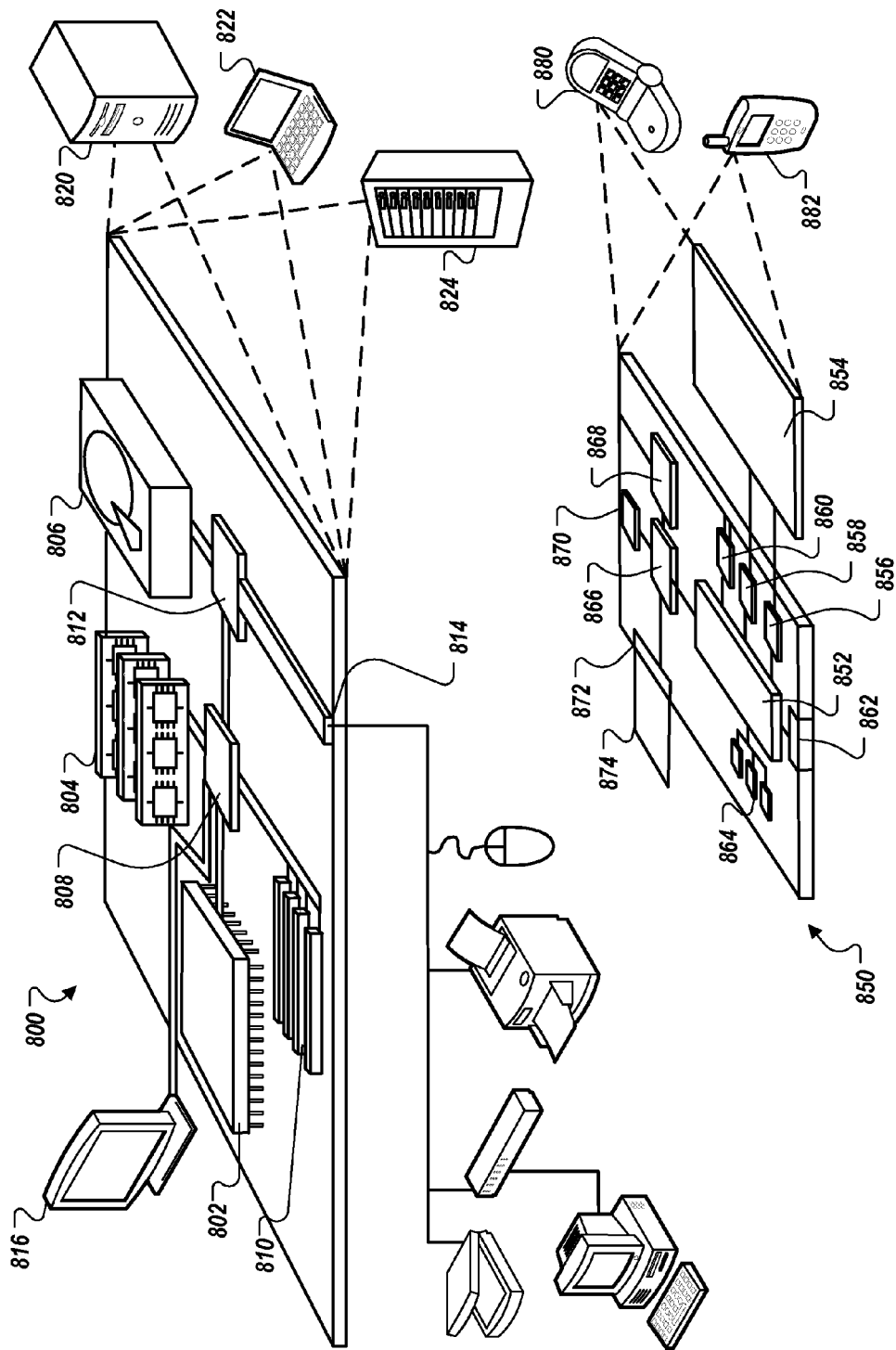
FIG. 8 is a block diagram of computing devices that may be used to implement the systems and methods described in this document.

FIG. 8 is a block diagram of computing devices 800, 850 that may be used to implement the systems and methods described in this document, as either a client or as a server or plurality of servers. Computing device 800 is intended to represent various forms of digital computers, such as laptops, desktops, workstations, personal digital assistants, servers, blade servers, mainframes, and other appropriate computers. Computing device 850 is intended to represent various forms of mobile devices, such as personal digital assistants, cellular telephones, smartphones, and other similar computing devices. Additionally computing device 800 or 850 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 800 includes a processor 802, memory 804, a storage device 806, a high speed interface 808 connecting to memory 804 and high speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, or memory on processor 802.

The high speed controller 808 manages bandwidth-intensive operations for the computing device 800, while the low speed controller 812 manages lower bandwidth-intensive operations. Such allocation of functions is exemplary only. In one implementation, the high speed controller 808 is coupled to memory 804, display 816 (e.g., through a graphics processor or accelerator), and to high speed expansion ports 810, which may accept various expansion cards (not shown). In the implementation, low speed controller 812 is coupled to storage device 806 and low speed expansion port 814. The low speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. Additionally, the processor may be implemented using any of a number of architectures. For example, the processor 802 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT (Thin-Film-Transistor Liquid Crystal Display) display or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provide in communication with processor 852, so as to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In Line Memory Module) card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provide as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852 that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, WiFi, or other such transceiver (not shown). In addition, GPS (Global Positioning System) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smartphone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A method performed by a data processing apparatus, the method comprising:
   receiving, from a user device, a request to access a resource, the resource being associated both with a first content category and with a second content category;
   maintaining two or more content categories including the first content category and the second content category, each content category assigned a score and a content access policy, wherein a first content access policy for the first content category denies access to resources assigned to the first content category and a second content access policy for the second content category permits access to resources assigned to the second content category, and a first score assigned to the first content category is different than a second score assigned to the second content category;
   selecting the first content access policy or the second content access policy for the user device access to the resource using the respective scores for the first and second content categories; and
   selectively permitting or denying access to the resource by the user device using the selected content access policy.

2. The method of claim 1, wherein selecting the first content access policy or the second content access policy comprises:
   determining whether the first score is greater than the second score; and
   selecting the first content access policy based on determining that the first score is greater than the second score.

3. The method of claim 2, wherein selecting the first content access policy or the second content access policy comprises:
   comparing the first score with a threshold score value; and
   selecting the first content access policy for the user device access to the resource based on the first score being greater than the threshold score value.

4. The method of claim 1, wherein selecting the first content access policy or the second content access policy comprises:
   comparing a highest score for the first content category and the second content category with a threshold score value, wherein the highest score represents a higher priority; and
   selecting a default content access policy as the selected content access policy based on the highest score not being greater than the threshold score value.

5. The method of claim 1, wherein the content categories and the corresponding scores are defined in a policy group that includes the first content access policy and the second content access policy.

6. The method of claim 1, further comprising:
   providing instructions for the presentation of a user interface, the instructions including a policy group name and a content category name for at least one of the two or more content categories; and
   receiving information associated with at least one of the two or more content categories;
   wherein the maintaining comprises maintaining the received information.

7. The method of claim 6, wherein the information comprises a score assigned to one of the two or more content categories.

8. The method of claim 6, wherein the information comprises a permission selection for one of the two or more content categories.

9. The method of claim 8, wherein the content access policy for a specific content category is based on a corresponding permission selection for the specific content category.

10. The method of claim 1, wherein selecting the first content access policy or the second content access policy comprises:
    determining whether the second score is greater than the first score; and
    selecting the second content access policy based on determining that the second score is greater than the first score.

11. A non-transitory computer storage medium encoded with instructions that, when executed by one or more computers, cause the one or more computers to perform operations comprising:
    receiving, from a user device, a request to access a resource, the resource being associated both with a first content category and with a second content category;
    maintaining two or more content categories including the first content category and the second content category, each content category assigned a score and a content access policy, wherein a first content access policy for the first content category denies access to resources assigned to the first content category and a second content access policy for the second content category permits access to resources assigned to the second content category, and a first score assigned to the first content category is different than a second score assigned to the second content category;
    selecting the first content access policy or the second content access policy for the user device access to the resource using the respective scores for the first and second content categories; and
    selectively permitting or denying access to the resource by the user device using the selected content access policy.

12. The computer storage medium of claim 11, wherein selecting the first content access policy or the second content access policy comprises:
    determining whether the first score is greater than the second score; and
    selecting the first content access policy based on determining that the first score is greater than the second score.

13. The computer storage medium of claim 12, wherein selecting the first content access policy or the second content access policy comprises:
    comparing the first score with a threshold score value; and
    selecting the first content access policy for the user device access to the resource based on the first score being greater than the threshold score value.

14. The computer storage medium of claim 11, wherein selecting the first content access policy or the second content access policy comprises:
    comparing a highest score for the first content category and the second content category with a threshold score value, wherein the highest score represents a higher priority; and
    selecting a default content access policy as the selected content access policy based on the highest score not being greater than the threshold score value.

15. The computer storage medium of claim 11, wherein the content categories and the corresponding scores are defined in a policy group that includes the first content access policy and the second content access policy.

16. The computer storage medium of claim 11, the operations further comprising:
    providing instructions for the presentation of a user interface, the instructions including a policy group name and a content category name for at least one of the two or more content categories; and
    receiving information associated with at least one of the two or more content categories; wherein the maintaining comprises maintaining the received information.

17. The computer storage medium of claim 16, wherein the information comprises a score assigned to one of the two or more content categories.

18. The computer storage medium of claim 16, wherein the information comprises a permission selection for one of the two or more content categories.

19. The computer storage medium of claim 18, wherein the content access policy for a specific content category is based on a corresponding permission selection for the specific content category.

20. The computer storage medium of claim 11, wherein selecting the first content access policy or the second content access policy comprises:
    determining whether the second score is greater than the first score; and
    selecting the second content access policy based on determining that the second score is greater than the first score.

21. A system comprising:
    one or more computers and one or more storage devices storing instructions that are operable, when executed by the one or more computers, to cause the one or more computers to perform operations comprising:
    receiving, from a user device, a request to access a resource, the resource being associated both with a first content category and with a second content category;
    maintaining two or more content categories including the first content category and the second content category, each content category assigned a score and a content access policy, wherein a first content access policy for the first content category denies access to resources assigned to the first content category and a second content access policy for the second content category permits access to resources assigned to the second content category, and a first score assigned to the first content category is different than a second score assigned to the second content category;
    selecting the first content access policy or the second content access policy for the user device access to the resource using the respective scores for the first and second content categories; and
    selectively permitting or denying access to the resource by the user device using the selected content access policy.

22. The system of claim 21, wherein selecting the first content access policy or the second content access policy comprises:
    determining whether the first score is greater than the second score; and
    selecting the first content access policy based on determining that the first score is greater than the second score.

23. The system of claim 22, wherein selecting the first content access policy or the second content access policy comprises:

comparing the first score with a threshold score value; and selecting the first content access policy for the user device access to the resource based on the first score being greater than the threshold score value.

24. The system of claim 21, wherein selecting the first content access policy or the second content access policy comprises:

comparing a highest score for the first content category and the second content category with a threshold score value, wherein the highest score represents a higher priority; and selecting a default content access policy as the selected content access policy based on the highest score not being greater than the threshold score value.

25. The system of claim 21, wherein the content categories and the corresponding scores are defined in a policy group that includes the first content access policy and the second content access policy.

26. The system of claim 21, the operations further comprising:

providing instructions for the presentation of a user interface, the instructions including a policy group name and a content category name for at least one of the two or more content categories; and receiving information associated with at least one of the two or more content categories; wherein the maintaining comprises maintaining the received information.

27. The system of claim 26, wherein the information comprises a score assigned to one of the two or more content categories.

28. The system of claim 26, wherein the information comprises a permission selection for one of the two or more content categories.

29. The system of claim 28, wherein the content access policy for a specific content category is based on a corresponding permission selection for the specific content category.

30. The system of claim 21, wherein selecting the first content access policy or the second content access policy comprises:

determining whether the second score is greater than the first score; and selecting the second content access policy based on determining that the second score is greater than the first score.

* * * * *